(12) United States Patent
Comtat et al.

(10) Patent No.: US 10,464,698 B2
(45) Date of Patent: Nov. 5, 2019

(54) FILLING HEAD FOR FILLING A TANK WITH A LIQUID

(71) Applicant: AKWEL SA, Champfromier (FR)

(72) Inventors: Didier Comtat, Monteux (FR); Lionel Joly, Lirac (FR); Antoine Marier, Sorgues (FR); Santiago Andrade Calvo, Galicia (ES)

(73) Assignee: AKWEL SA, Champfromier (FR)

( * ) Notice: Subject to any disclaimer, the term of this patent is extended or adjusted under 35 U.S.C. 154(b) by 192 days.

(21) Appl. No.: 15/603,746

(22) Filed: May 24, 2017

(65) Prior Publication Data

US 2017/0341787 A1 Nov. 30, 2017

(30) Foreign Application Priority Data

May 27, 2016 (FR) ...................................... 16 54788

(51) Int. Cl.
B60K 15/04 (2006.01)
B65B 3/18 (2006.01)
(Continued)

(52) U.S. Cl.
CPC .............. B65B 3/18 (2013.01); B67D 7/0288 (2013.01); F01N 3/2066 (2013.01); B60K 13/04 (2013.01); B60K 2015/03394 (2013.01); B60K 2015/03538 (2013.01); B60K 2015/03552 (2013.01); B60K 2015/048 (2013.01); B67D 7/42 (2013.01); F01N 2610/1413 (2013.01); Y02A 50/2325 (2018.01); Y02T 10/24 (2013.01)

(58) Field of Classification Search
CPC . B65B 3/18; F01N 3/2066; F01N 2610/1413; B67D 7/0288; B67D 7/42; B60K 13/04; B60K 15/04; B60K 2015/048; B60K 2015/03552; B60K 2015/03394; B60K 2015/03538; B60K 2015/0458; Y02A 50/2325; Y02T 10/24
See application file for complete search history.

(56) References Cited

U.S. PATENT DOCUMENTS 8,919,393 B2 * 12/2014 Budzyk .................. B60K 15/04
141/290
9,701,531 B2 * 7/2017 Desch ...................... B67D 7/42
(Continued)

FOREIGN PATENT DOCUMENTS

DE 10 2011 009 745 A1 8/2012
DE 20 2011 105 302 U1 12/2012
(Continued)

Primary Examiner — Nicolas A Arnett
(74) Attorney, Agent, or Firm — Oliff PLC

(57) ABSTRACT

A filling head for filling a tank with a liquid, the filling head delimiting a conduit for filling the tank which extends axially along a filling axis from an upstream section which is adapted to receive a filling nozzle, up to a downstream section which is designed to be connected on the tank to fill, and a degassing circuit including an inlet which is adapted to be connected on the tank and an outlet in communication with the outside, the filling head being characterized in that it delimits a suction window which connects the downstream section of the filling conduit on the degassing circuit, so as to promote the suction of the gases via the degassing circuit, during the filling of the tank.

11 Claims, 2 Drawing Sheets

(51) Int. Cl.
    *B67D 7/02*     (2010.01)
    *F01N 3/20*     (2006.01)
    *B67D 7/42*     (2010.01)
    *B60K 15/035*     (2006.01)
    *B60K 13/04*     (2006.01)
    *B60K 15/03*     (2006.01)

(56) References Cited

U.S. PATENT DOCUMENTS

| | | | |
|---|---|---|---|
| 2005/0205160 A1* | 9/2005 | Ganachaud | B60K 15/04 141/351 |
| 2009/0321441 A1* | 12/2009 | Horlacher | B60K 15/04 220/86.2 |
| 2011/0209465 A1* | 9/2011 | Novellani | F01N 3/2066 60/299 |
| 2012/0181274 A1* | 7/2012 | Fetzer | B29C 45/006 220/86.2 |
| 2013/0306665 A1* | 11/2013 | Eberhardt | B60K 15/04 220/746 |
| 2016/0297669 A1* | 10/2016 | Desch | B67D 7/42 |
| 2017/0001516 A1* | 1/2017 | Beck | B60K 15/04 |
| 2017/0184000 A1* | 6/2017 | Koukan | B60K 13/04 |

FOREIGN PATENT DOCUMENTS

| | | |
|---|---|---|
| DE | 10 2013 016 683 A1 | 4/2015 |
| EP | 2719567 A1 | 4/2014 |
| EP | 2 752 326 A1 | 7/2014 |
| EP | 2 789 490 A1 | 10/2014 |
| EP | 2 927 040 A1 | 10/2015 |

\* cited by examiner

FILLING HEAD FOR FILLING A TANK WITH A LIQUID

The invention concerns a filling head for filling a tank with a liquid, and more particularly for filling a tank belonging to a device for depollution by selective catalytic reduction for a motor vehicle.

A device for depollution by selective catalytic reduction, also known by the acronym «SCR», is a technology currently used for the depollution of nitrogen oxides NOx, on vehicles with a heat engine such as a Diesel engine.

This type of device generally includes at least one tank for storing a liquid additive product containing urea, a head for filling the tank, a catalyst with an injector, a metering module, and a control and driving device.

The user of the vehicle equipped with such a depollution device should be able to carry out the filling of the tank by himself, in a service station for example.

To this end, the filling head, generally tubular-shaped, is arranged so as to be accessible from the outside of the vehicle, upstream of the tank.

The filling head includes a conduit for filling the tank which extends axially along a filling axis from an upstream section which is adapted to receive the filling nozzle, up to a downstream section which is designed to be connected to the tank to fill via a conduit.

This type of filling head is generally associated with a degassing circuit which promotes the evacuation of the gases which are expelled by the liquid during the filling of the tank.

In general, the degassing circuit includes an inlet which is in communication with the tank, and an outlet which is in communication with the outside of the depollution device and which allows discharging the gases into the atmosphere.

Such a filling head is described and represented in the document EP-A1-2719567, for example.

In order to fill the tank, the filling nozzle is introduced in the filling conduit of the filling head, the user actuates the nozzle which spills out a liquid jet through the filling head until the tank is full and starts flowing back the liquid.

In order to prevent a backflow of liquid outside of the vehicle, the nozzle is generally equipped with a device for automatically shutting off the jet.

Nonetheless, at use, a backflow and a sputtering of liquid are sometimes observed despite the presence of the device for automatically shutting off the jet, in particular depending on the angle of inclination of the nozzle in the filling head.

Also, the user should be able to benefit from several automatic nozzle shut-offs at the end of filling without any risk of fluid discharge to the outside. As example, some manufacturers require enabling three automatic shut-offs without any risk of discharges in order to fill the tank to its maximum level.

In addition, the filling heads according to the prior art do not allow a sufficient filling rate. By sufficient filling rate is meant a rate close to 40 liters per minute. This rate of 40 liters per minute would allow a time saving for the car manufacturer during the assembly of the vehicle. The rate of 40 liters per minute would also have the advantage of allowing the motorist customer to fill his tank, in a service station, indifferently with pumps provided for light vehicles or pumps provided for heavy-goods vehicles, since not all service stations are equipped with specific pumps, with a low rate, for light vehicles.

The present invention aims in particular to solve these drawbacks and, to do so, relates to a filling head for filling a tank with a liquid, the filling head delimiting:

a conduit for filling the tank which extends axially along a filling axis from an upstream section which is adapted to receive a filling nozzle, up to a downstream section which is designed to be connected on the tank to fill, and a degassing circuit including an inlet which is adapted to be connected on the tank and an outlet in communication with the outside, the filling head being characterized in that it delimits a suction window which connects the downstream section of the filling conduit to the degassing circuit, so as to promote the suction of the gases via the degassing circuit, during the filling of the tank.

More particularly, the invention concerns a filling head for filling a tank with a liquid, the filling head delimiting:

a conduit for filling the tank which extends axially along a filling axis (A) from an upstream section which is adapted to receive a filling nozzle, up to a downstream section which is designed to be connected on the tank to fill, an annular sealing collar which extends around the filling axis (A) and which is designed to form an annular lip seal which conforms to the peripheral face of the nozzle, and a degassing circuit including an inlet which is adapted to be connected on the tank and an outlet in communication with the outside, as well as a filling chamber which is interposed between the inlet and the outlet and in communication with these latter, said outlet being formed by a degassing window located upstream with respect to the sealing collar and arranged so as to allow the gases to escape from the chamber to the outside, the filling head being characterized in that it delimits, downstream of the sealing collar, at least one suction window which connects the chamber of the degassing circuit to the downstream section of the filling conduit, and which is arranged at the outlet of the nozzle, so as to promote the suction via the degassing circuit of the gases which escape from the tank, during the filling of the tank.

The suction window allows depressurizing the degassing circuit, which promotes the escape of the gases during the filling of the tank and avoids inadvertent cut-offs during the filling phase which are related to insufficient degassing and flow.

Indeed, the liquid flow which is injected by the nozzle generates, by its flow speed, a depression in the downstream section of the filling conduit of the filling head. The suction window sets the downstream section and the degassing circuit in communication with each other, which allows depressurizing the degassing circuit so as to promote the degassing.

It is observed that the absence of this window leads to rises of liquid, so that the nozzle is frequently triggered and the filling time then significantly increases.

According to another feature of the invention, the filling head delimits a filling chamber which communicates with the suction window and which is adapted to be filled with repelled liquid.

The chamber allows delaying the backflow of liquid by being filled, which leaves more time for the automatic nozzle turning-off device to be triggered.

According to another feature of the invention, the filling chamber is in communication with the inlet and the outlet of the degassing circuit of the filling head.

In other words, the chamber belongs to the degassing circuit. The chamber has thus a dual function.

According to another feature of the invention, the upstream section of the filling conduit delimits a degassing window which forms the outlet of the degassing circuit.

This degassing window opens into the upstream section of the filling conduit so as to allow the gases to circulate through the degassing circuit, to the outside at atmospheric pressure.

According to another feature of the invention, the filling conduit is equipped with an annular sealing collar which extends around the filling axis and which is designed to cooperate with a filling nozzle.

The collar is designed to avoid any direct rise of fluid to the outside during the filling phase and after several triggers of the nozzle. Thus, the risks of sputtering and discharge are avoided.

Advantageously, the collar is located upstream of the area of detection of liquid by the nozzle.

According to another feature of the invention, the filling head is equipped with a permanent magnet which is inserted in a recess of the upstream section of the filling conduit and which is adapted to act on a device for automatically turning off the filling nozzle.

According to another feature of the invention, the filling head includes at least one retaining finger which bears axially on the magnet so as to retain the magnet in its recess.

The retaining finger blocks the magnet in position and prevents it from vibrating.

According to another feature of the invention, the filling head includes a sealing ring which is elastically-deformable and which forms the degassing window, the sealing collar and the retaining stud, into one piece.

According to another feature of the invention, the filling head includes a stop which projects radially in the filling conduit so as to limit the axial stroke of the filling nozzle.

The invention also concerns a device for depollution by catalytic reduction including a filling head of the previously described type.

Other features and advantages of the invention will appear upon reading the following detailed description for an understanding of which reference will be made to the appended drawings in which.

Figure 2:
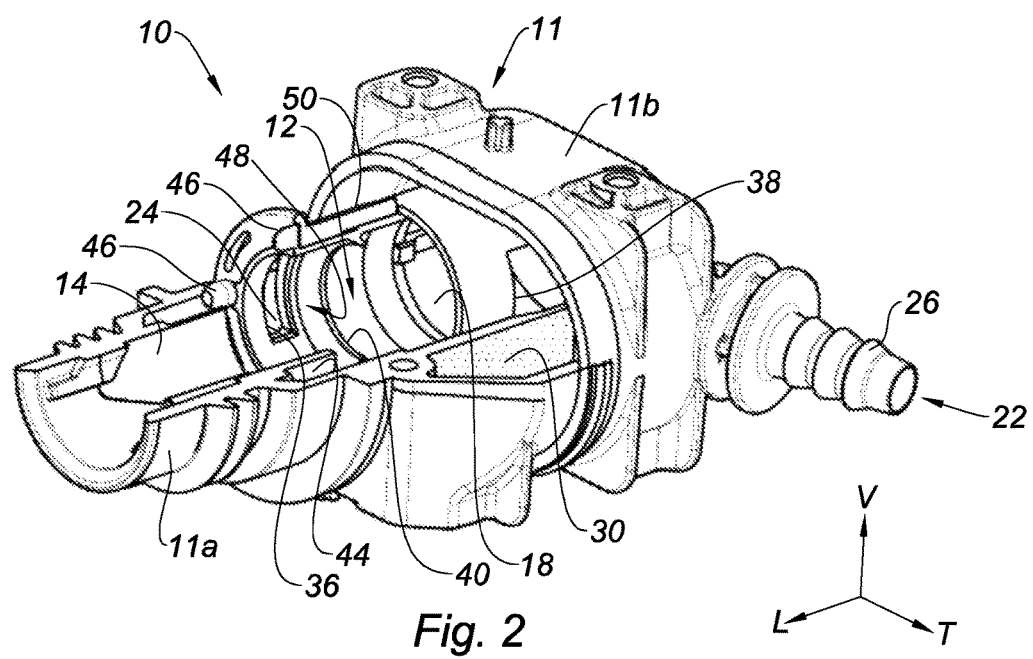
FIG. 2 is a cutaway perspective view, which illustrates the filling head of FIG. 1 delimiting in particular the suction window, the filling chamber and the degassing window.

It should be noted that, in the present patent application, the terms «upstream» and «downstream» should be understood with respect to the circulation of the liquid during filling through the filling head, that is to say from the left to the right according to FIG. 2.

In addition, in order to clarify the description and the claims, the terms longitudinal, vertical and transverse will be adopted without limitation with reference to the three dimensional axes L, V, T indicated in the figures, whose axis L is parallel to the axis of the filling head.

Figure 1:
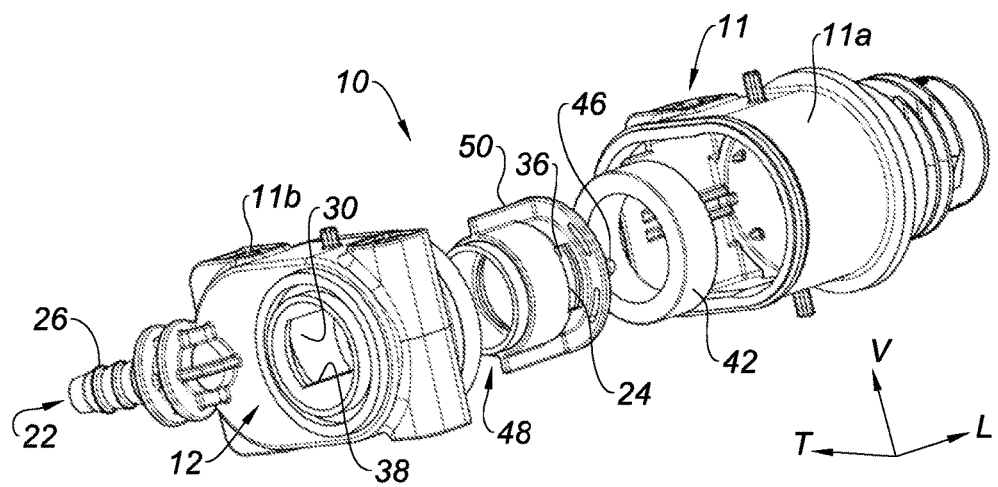
FIG. 1 is an exploded perspective view, which illustrates a filling head according to the invention.

In FIG. 1 is represented a filling head 10 for filling a tank 60 with a liquid, more particularly an additive liquid containing urea.

The filling head 10 is designed to be integrated to a device for depollution by selective catalytic reduction (not represented).

The filling head is essentially constituted by a body 11 which is made into two portions 11a, 11b.

Figure 4:
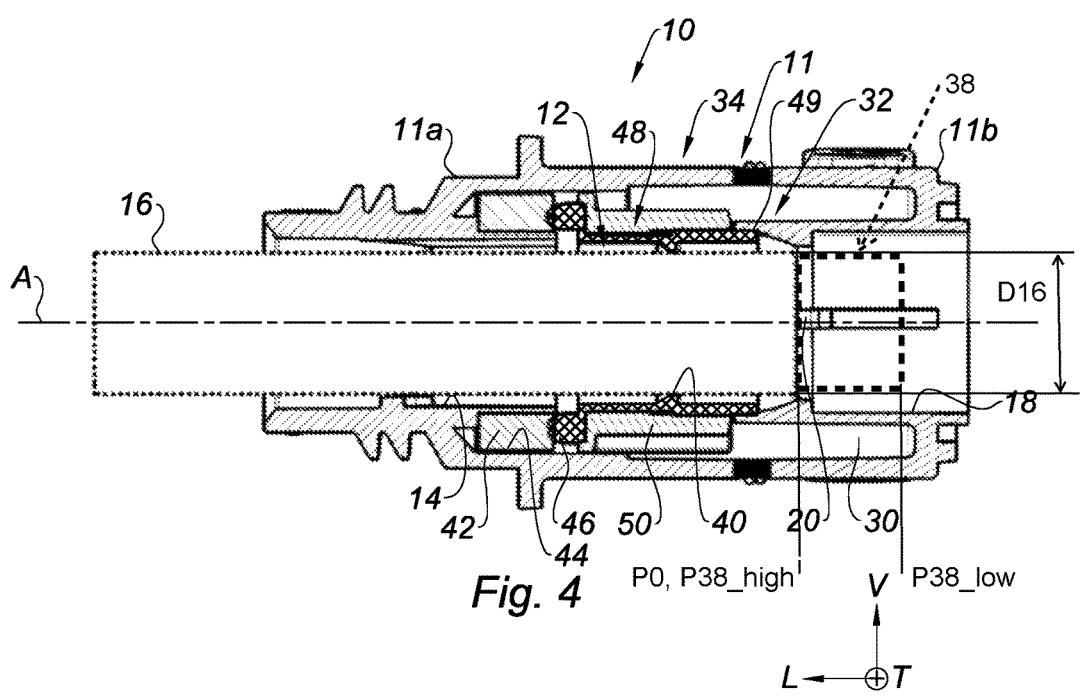
FIG. 4 is a longitudinal sectional view, which illustrates the arrangement of a filling nozzle in the filling head.

As can be seen in FIG. 4, the filling head 10 delimits an inner filling conduit 12 which extends axially along a longitudinal filling axis A, from an upstream section 14 which is adapted to receive a filling nozzle 16, up to a downstream section 18 which is designed to be connected on the tank to fill.

Figure 3:
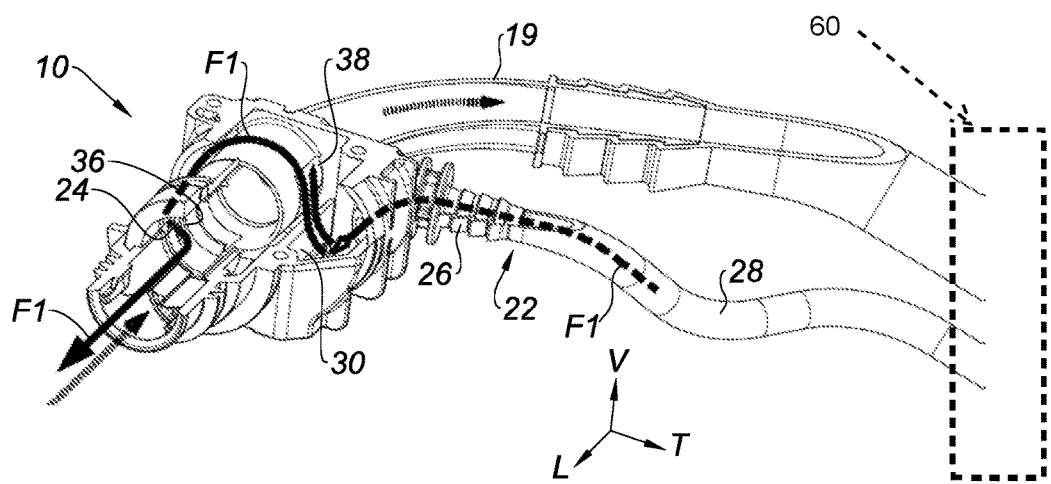
FIG. 3 is a cutaway perspective view, which illustrates the direction of circulation of the filling liquid and of the exhaust gases through the filling head according to the invention.

For this purpose, the downstream section 18 of the filling conduit 12 is connected to the tank 60 via a connecting tubing 19 shown in FIG. 3.

The upstream section 14 of the filling conduit 12 extends up to a stop 20 which projects radially in the filling conduit 12 to limit the axial stroke of the filling nozzle 16.

Also, the filling head 10 delimits a degassing circuit which allows the evacuation of the gases expelled by the liquid during the filling of the tank 60.

To this end, the degassing circuit includes an inlet 22 which is adapted to be connected to the tank 60 and an outlet 24 which is in communication with the outside at atmospheric pressure.

As seen in FIG. 3, the inlet 22 of the degassing circuit is constituted by a connector 26 which is connected to an upper portion of the tank 60 by a flexible hose 28, in order to allow the gases present in the tank to escape during the filling.

The degassing circuit also comprises a filling chamber 30 which is interposed between the inlet 22 and the outlet 24 and which is in communication with the inlet 22 and the outlet 24 of the degassing circuit.

Referring to FIGS. 3 and 4, the filling chamber 30 is formed by a generally annular cavity which extends around the filling conduit 12 and which is delimited by an inner wall 32 and an outer wall 34 of the body 11 of the filling head 10.

Preferably, as shown in FIGS. 1 to 4, the filling chamber 30 formed by an annular cavity is delimited by an annular inner wall 32 which (laterally) separates said annular chamber 30 from said conduit 12 and throughout the (radial) thickness of which the suction window 38 is pierced.

Advantageously, the suction window 38 may thus be disposed substantially tangent to the filling conduit 12, and therefore substantially tangent to the liquid jet, which promotes the suction.

In addition, the upstream section 14 of the filling conduit 12 delimits a degassing window 36 which forms the outlet 24 of the degassing circuit.

The degassing window 36, shown in particular in FIGS. 2 and 3, is formed in the inner wall 32, facing the nozzle 16, and allows the exhaust gases to escape from the chamber 30 to the outside at atmospheric pressure.

The arrows F1 shown in FIG. 3 illustrate the circulation of the exhaust gases.

According to another aspect of the invention, the filling head 10 delimits a suction window 38 which connects the downstream section 18 of the filling conduit on the degassing circuit so as to promote the suction of the gases via the degassing circuit during the filling of the tank.

As seen in FIG. 3, the suction window 38 opens into the filling chamber 30 which belongs to the degassing circuit.

Thus, during the filling of the tank by the nozzle 16, the flow of liquid which flows from the free end of the nozzle 16 causes, by its flow velocity, a depression in the chamber 30, this depression promoting the suction of the gases contained in the tank.

Consequently, by promoting the circulation of the exhaust gases through the exhaust circuit, the suction window 38 allows increasing the filling rate of the tank.

Advantageously, in order to promote the suction of the exhaust gases, the suction window 38 is arranged directly at the outlet of the nozzle 16, that is to say directly downstream of the stop 20 which limits the stroke of the nozzle 16.

Indeed, such a positioning of the suction window 38 immediately downstream of the nozzle allows taking benefit of a minimum flow section, that is to say a minimum diameter of the liquid jet injected by the nozzle 16, and consequently a maximum liquid speed, and therefore the best possible suction by Venturi effect.

Furthermore, the axial height of the suction window 38, according to which said suction window 38 extends, along the axis A of the filling head 10, downstream of the end of the nozzle 16, will be sufficiently restricted to avoid that, because of the divergence angle (opening angle) of the liquid jet, liquid is directly projected by the nozzle 16 in said suction window 38, which would reduce the suction performances.

As such, as illustrated in FIG. 4, it will be noted that the distance which separates axially, along the axis A, a reference position P0 which corresponds to the downstream end of the nozzle 16, and therefore to the stop 20, from the downstream opening limit of the suction window 38 (that is to say from the lower limit of said suction window 38) P38_low, said downstream opening limit P38_low being located downstream of said reference position P0, is preferably smaller than or equal to 130%, and even smaller than or equal to 110% of the inner diameter D16 of the nozzle 16, that is to say of the minimum diameter of the liquid jet.

Similarly, the upstream limit P38_high of the suction window 38 will be preferably located, in abscissa along the axis A, within a range of positions comprised between 20% of the inner diameter D16 of the nozzle, upstream of the reference position P0, and 30% of the diameter D16 downstream of the reference position P0.

Preferably, said upstream limit P38_high of the suction window P38 will axially coincide with the reference position P0, or will be placed slightly downstream of the reference position P0, for example at a distance from the reference position P0 comprised between 15% and 25%, and even between 20% and 25% of the inner diameter D16 of the nozzle.

As an indication, and in particular for an inner diameter D16 of the nozzle 16 comprised between 15 mm and 20 mm, and more particularly equal to 16 mm, if we consider, as a reference position P0 along the axis A, the upstream abscissa of the stop 20 and therefore the abscissa of the downstream end of the nozzle 16 corresponding to the abscissa of emission of the liquid jet in the filling conduit 12, then the suction window 38 will extend:

from an upstream limit P38_high which is preferably comprised between 5 mm, and even 3 mm, upstream of the reference position P0 and 5 mm downstream of said reference position P0, and for example, preferably between 3 mm and 4 mm downstream of the reference position P0, and more particularly at 3.5 mm (namely about 22% of 16 mm), downstream of the reference position P0, and/or, according to a preferred feature which may constitute an invention on its own, up to a downstream limit P38_low comprised between 15 mm and 25 mm, and preferably between 15 mm and 20 mm, and for example at about 17.5 mm (namely about 110% of 16 mm), downstream of the reference position P0.

According to a preferred embodiment, the suction window 38 has a surface area in the order of 220 square millimeters, for example with an axial height of 13 millimeters along the axis A of the filling head 10, and a width of 17 millimeters. It should be noted that the shape of the suction window 38 may be other than that of the represented rectangular, for example a rather triangular, trapezoidal, circular, or oval shape. Similarly, the suction window 38 may be constituted by several openings, so as to deliver the most adapted suction.

It will be noted that the positioning and sizing features of the suction window 38 may constitute an invention on its own, and be implemented in any filling head 10 intended to receive a filling nozzle 16 in a determined docking position, preferably against a stop 20, and this regardless, amongst others, of the presence or absence of a sealing collar 40, and/or regardless of the existence or absence of a degassing window 36 which is distinct from said suction window 38 (although the presence of such a degassing window 36, distinct from and complementary with the suction window 38, is nevertheless preferred).

The suction window 38 also allows the passage of the filling liquid from the filling conduit 12, up to the filling chamber 30, in case of a rise of fluid by the tubing 19.

Indeed, the filling chamber 30 is adapted to be filled with liquid repelled from the tubing 19 at the end of tank filling.

Thus, when the tank is full, the liquid is repelled up to the filling head 10 via the tubing 19, and then the liquid penetrates in the filling chamber 30.

This feature allows delaying and limiting the rise of liquid toward the upstream section 14 of the filling conduit 12.

More particularly, this arrangement consisting in providing that at least a portion of the filling chamber 30 as well as the suction window 38 are located downstream of the stop 20, and therefore downstream of the end of the nozzle 16, allows the liquid overflow which rises via the tubing 19 to spill out first in the filling chamber 30, through the suction window 38, before said repelled liquid reaches the nozzle 16, which stabilizes the rise of the liquid and avoids the risks of sputtering.

It will also be noted that the use of the suction window 38 and of the filling chamber 30 as a spillway of a rising liquid overflow may also be implemented, alternatively, within a filling head devoid of a sealing collar 40 as described hereinafter.

It will also be noted that the liquid can penetrate in the degassing circuit beyond the chamber 30, for example up to the inlet 22 of the degassing circuit.

In addition, the filling conduit 12 is equipped with an annular sealing collar 40 which extends around the filling axis A and which is designed to cooperate with the filling nozzle 16.

As seen in FIG. 4, the collar 40 forms an annular lip seal which conforms to the peripheral face of the nozzle 16 to prevent the liquid from rising up via the upstream section 14 of the filling conduit 12.

Hence, the liquid cannot rise up directly via the filling conduit 12, and has therefore to follow the preferred circuit by passing through the suction window 38 and the chamber 30.

This feature allows slowing the rise of the liquid while maintaining the degassing function for even longer.

Several cut-offs of the nozzle are therefore possible without any risk of liquid discharge.

It will also be noted that the use of a suction window 38 and a degassing window 36 distinct from each other, and each axially located on a different side (respectively on the downstream side and on the upstream side) of the sealing collar 40, advantageously allows optimizing each of the respective suction and degassing functions.

In particular, such an arrangement allows making each of these functions immediately available from the very beginning of filling, while conferring optimum performances to said function, and maintaining each of said functions operational as long as possible during filling.

In a non-limiting manner, it is possible to add baffles in the chamber 30 in order to slow down the stroke of the liquid even further.

Also, the filling head 10 is equipped with a permanent magnet 42 which is inserted in a recess 44 of the upstream section 14 of the filling conduit 12 and which is adapted to act on a device (not represented) for automatically turning off the filling nozzle 16.

The recess 44 has an annular shape, complementary to the shape of the magnet 42, which extends around the filling axis A, the recess being open axially toward the downstream section 18 so as to allow the insertion of the magnet 42 during mounting of the filling head 10.

In a complementary manner, the filling head 10 includes a plurality of retaining fingers 46 which are distributed around the filling axis A and which extend axially from a sealing ring 48, toward the magnet 42. Each retaining finger 46 bears axially on the magnet 42 so as to retain the magnet 42 in its recess 44.

According to another aspect, referring to FIG. 4, the sealing ring 48 has a cylindrical-shaped downstream free end 49 which cooperates with a complementary sleeve formed by the body 11 of the filling head, so as to limit the penetration of liquid from the downstream section 18 of the filling conduit 12, up to the degassing circuit.

Referring to FIG. 2, the sealing ring 48 forms the degassing window 36, the sealing collar 40 and the retaining fingers 46, in one piece.

The ring 48 is made of an elastically-deformable material, preferably of elastomer, for example of ethylene-propylene-diene monomer.

This feature allows the collar 40 to be elastically deformed so as to guarantee sealing around the nozzle 16, and also allows the retaining fingers 46 to damp the magnet 42 in order to prevent it from vibrating.

As seen in FIGS. 1 and 4, the ring 48 is arranged in a tubular guide 50 which is mounted in the body 11 of the filling head 10 along the filling axis A.

It will be noted that the chamber 30 is partially delimited by the guide 50 and that the guide 50 also delimits the degassing window 36.

As such, it will be noted that, according to a preferred variant, the degassing window 36 is not formed in the deformable ring 48, but is rather arranged in the tubular guide 50.

Alternatively, the ring 48 may be made by overmolding over the tubular guide 50.

In this case, the ring 48 may be made of an elastomer (rubber), such as EPDM, or further, and preferably, of a vulcanized thermoplastic material, for example a PP/EPDM mixture, which has in particular the advantage of effectively adhering to the tubular guide 50, in particular when said guide 50 is made of polypropylene (PP), whether filled or not with reinforcing fibers.

Furthermore, the aforementioned vulcanized thermoplastic materials have the advantage of being compatible with the aqueous urea solutions, and besides have injection cycle time durations shorter than the cycle time durations required for rubbers.

According to a non-represented variant, the sealing ring 48 forms a rim which is adapted to obstruct the recess 44 of the magnet 42 in order to prevent the liquid from penetrating in the recess 44.

The present description of the invention is given as a non-limiting example.

In particular, said invention also covers as such a method for using, within a filling head 10 according to any one of the variants of the invention and connected to a tank, a liquid flow injected in the filling conduit 12 of said head 10 by a filling nozzle 16 to generate, thanks to the flow speed of said liquid, a depression in the degassing circuit, through a suction window 38 that is arranged in the wall of the filling conduit 12 directly at the outlet of said nozzle 16, so as to promote the suction via the degassing circuit of the gases escaping from the tank 60.

The invention claimed is:

1. A filling head for filling a tank with a liquid, the filling head delimiting:
   a conduit for filling the tank which extends axially along a filling axis from an upstream section which is adapted to receive a filling nozzle, up to a downstream section which is designed to be connected on the tank to fill,
   an annular sealing collar which extends around the filling axis and which is designed to form an annular lip seal which conforms to the peripheral face of the nozzle, and
   a degassing circuit including an inlet which is adapted to be connected on the tank and an outlet in communication with the outside, as well as a filling chamber which is interposed between the inlet and the outlet and in communication with these latter, said outlet being formed by a degassing window located upstream with respect to the sealing collar and arranged so as to allow the gases to escape from the chamber to the outside,
   the filling head wherein it delimits, downstream of the sealing collar, at least one suction window which connects the chamber of the degassing circuit to the downstream section of the filling conduit, and which is arranged at the outlet of the nozzle, so as to promote the suction via the degassing circuit of the gases which escape from the tank, during the filling of the tank.

2. The filling head according to claim 1, wherein it includes a stop which projects radially in the filling conduit so as to limit the axial course of the filling nozzle and in that the suction window is arranged directly downstream of said stop.

3. The filling head according to claim 1, wherein the filling chamber communicates with the downstream conduit section through the suction window so as to enable the filling of said filling chamber with liquid repelled from the filling conduit.

4. The filling head according to claim 1, wherein the upstream section of the filling conduit delimits at least one degassing window which forms the outlet of the degassing circuit.

5. The filling head according to claim 4, wherein it includes:
   at least one retaining finger which bears axially on the magnet so as to retain the magnet in its recess, and
   a sealing ring which is elastically-deformable and which forms the degassing window, the sealing collar and the retaining finger, in one piece.

6. The filling head according to claim 1, wherein the filling chamber is formed by an annular cavity which extends around the filling conduit and which is delimited by an annular inner wall which separates it from said conduit and throughout the thickness of which the suction window is pierced.

7. The filling head according to claim 1, wherein it is equipped with a permanent magnet which is inserted in a recess of the upstream section of the filling conduit and which is adapted to act on a device for automatically turning off the filling nozzle.

8. The filling head according to claim 7, wherein it includes at least one retaining finger which bears axially on the magnet so as to retain the magnet in its recess.

9. The filling head according to claim 1, wherein the distance which separates axially, along the axis, a reference position, corresponding to the downstream end of the nozzle, from a downstream opening limit of the suction window, said downstream opening limit being located downstream of said reference position, is smaller than or equal to 130% of the inner diameter of the nozzle.

10. Using, within a filling head according to claim 1 connected to a tank, a liquid flow injected in the filling conduit of said head by a filling nozzle to generate, thanks to the flow speed of said liquid, a depression in the degassing circuit, through a suction window that is arranged in the wall of the filling conduit directly at the outlet of said nozzle, so as to promote the suction via the degassing circuit of the gases escaping from the tank.

11. A device for depollution by selective catalytic reduction for a motor vehicle or heavy-goods vehicle including a filling head according to claim 1.

* * * * *